(12) United States Patent
Wu et al.

(10) Patent No.: US 12,537,957 B2
(45) Date of Patent: Jan. 27, 2026

(54) CONTEXT MODELING IN ENTROPY CODING

(71) Applicant: Apple Inc., Cupertino, CA (US)

(72) Inventors: Yeqing Wu, Cupertino, CA (US); Yunfei Zheng, Santa Clara, CA (US); Alican Nalci, Cupertino, CA (US); Yixin Du, Milpitas, CA (US); Hilmi Enes Egilmez, Santa Clara, CA (US); Guoxin Jin, San Diego, CA (US); Alexandros Tourapis, Los Gatos, CA (US); Jun Xin, San Jose, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 168 days.

(21) Appl. No.: 18/468,900

(22) Filed: Sep. 18, 2023

(65) Prior Publication Data
US 2024/0129472 A1    Apr. 18, 2024

Related U.S. Application Data

(60) Provisional application No. 63/417,199, filed on Oct. 18, 2022.

(51) Int. Cl.
*H04N 19/13*     (2014.01)
*H04N 19/129*    (2014.01)
*H04N 19/176*    (2014.01)

(52) U.S. Cl.
CPC ........... *H04N 19/13* (2014.11); *H04N 19/129* (2014.11); *H04N 19/176* (2014.11)

(58) Field of Classification Search
CPC ..... H04N 19/13; H04N 19/129; H04N 19/176
See application file for complete search history.

(56) References Cited

U.S. PATENT DOCUMENTS

| 2015/0373336 | A1* | 12/2015 | Sasai ..................... H04N 19/105 |
| 2016/0227244 | A1* | 8/2016 | Rosewarne ............ H04N 19/70 |
| 2018/0070100 | A1* | 3/2018 | Chen ..................... H04N 19/174 |
| 2020/0154108 | A1* | 5/2020 | Wu ........................ G06F 9/3818 |

OTHER PUBLICATIONS

J. Han et al., "A Technical Overview of Av1", submitted to the IEEE for possible publication; arXiv:2008.06091v2 [eess.IV]; Feb. 8, 2021; 25 pages.
Y. Chen et al., "An Overview of Core Coding Tools in the AV1 Video Codec", 5 pages.

* cited by examiner

*Primary Examiner* — Zhubing Ren
(74) *Attorney, Agent, or Firm* — BakerHostetler (57) ABSTRACT

Improved lossless entropy coding techniques for coding of image data include selecting a context for entropy coding based on an ordered scan path of possible context locations. A symbol for a current location within a source image may be entropy coded based on a context of prior encoded symbols of other locations within source images, where the context is selected based on an ordered scan path enumerating a series of potential context locations within one or more source images. To select a context, a predetermined number of prior symbols may be selected by qualifying or disqualifying locations in the scan path, and then the current symbol may be encoded with a context based on prior symbols corresponding to the first qualifying context locations in the order of the scan path.

27 Claims, 5 Drawing Sheets

CONTEXT MODELING IN ENTROPY CODING

CROSS-REFERENCE TO RELATED APPLICATION(S)

The present application claims the benefit of U.S. Provisional Application No. 63/417,199, entitled "Improvement Of Context Modeling In Entropy Coding," filed Oct. 18, 2022, the disclosure of which is hereby incorporated herein in its entirety.

TECHNICAL FIELD

This disclosure relates to data compression, and, particularly, to lossless coding techniques used by image and video compression systems.

BACKGROUND

Lossless compression techniques provide reversable coding of a source data stream into a smaller encoded data stream without loss of information. Lossless coding techniques often use models of a non-uniform probability distribution of source data symbols to reduce information redundancy in the encoded data stream. For example, a lossless arithmetic entropy coder may map a sequence of symbols from a fixed alphabet of symbols into variable length codewords in an encoded data stream.

Lossless compression techniques often are used as subcomponent of a larger lossy compression technique. For example, lossy coding techniques generally involve a quantization process that eliminates some less important information, and often will generate a series of output symbols with a highly-skewed probably distribution, where certain symbols of the alphabet are much more likely than other symbols. A lossless entropy coding process applied to these symbols may use a model of the probability distribution to reduce bandwidth necessary to transmit (or memory required to store) the symbols without further loss.

DETAILED DESCRIPTION

Improved techniques for lossless entropy coding of image data include selecting a context for entropy coding based on an ordered scan path of possible context locations. A symbol for a current location within a source image may be entropy coded based on a context of prior encoded symbols of other locations within source images, where the context is selected based on an ordered scan path enumerating a series of potential context locations within one or more source images. To select a context, a predetermined number of prior symbols may be selected by qualifying or disqualifying locations in the scan path, and then the current symbol may be encoded with a context based on prior symbols corresponding to the first qualifying context locations in the order of the scan path. In aspects, the ordered scan path and/or the predetermined number of context values for encoding a symbol may be based on the type of symbol or the encoded syntax element that the symbol represents. A scan path location may be disqualified, for example, if no prior symbol was encoded for the that scan path location, or if coding parameters at the scan path location do not meet a qualification criteria. In some cases, entropy coding complexity may be reduced by combining prior symbols from multiple locations in the ordered scan path into a single context value.

In some coding systems, a current block may be encoded by referring only to neighboring blocks as an entropy encoding context. However, in some applications and for some syntax element types, neighboring block may be too correlated with the current block to provide the most predictive context. Hence a more general context including non-adjacent block may provide more effective lossless encoding. An ordered scan path of candidate context locations may provide a flexible system or more optimal context selection for encoding a variety of types of syntax elements.

Figure 1:
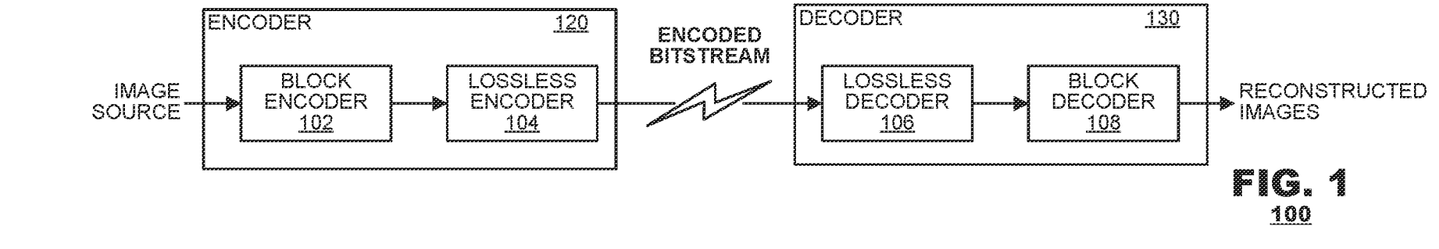
FIG. 1 is a block diagram of a coding system according to aspects of this disclosure.

FIG. 1 is a block diagram of a coding system 100 according to aspects of this disclosure. In the system 100, an image source of one or more images may be encoded by an encoder 120 including a block encoder 102 and a lossless encoder 104 to produce an encoded bitstream. The encoded bitstream may be stored in a computer readable medium or otherwise transmitted to a decoder 130, which includes a lossless decoder 106 and a block decoder 108. Decoder 130 may decode the encoded bitstream to produce one or more reconstructed images.

In operation, the block coder 102 may transform a portion of a source image into block data and corresponding encoding parameters. For example, block coder may partition source images into rectangularly-shaped pixel blocks, and may include various block-based image coding tools such as a frequency domain transform (e.g., a discrete cosine transform (DCT)), quantization, and prediction from prior coded image data. The lossless coder 104 may then encode symbols indicating encoding parameters for the portion of image data based on a context selected from prior coded blocks. For example, the block coder 102 may produce coding parameters for a current block including a motion vector and a prediction mode. The lossless coder 104 may losslessly encode the motion vector type parameter with an arithmetic entropy coder having a probability model of motion vector symbols that is conditioned on context values of prior motion vector parameters corresponding to locations of prior encoded pixel blocks. Similarly, the lossless coder 104 may losslessly encode the prediction mode parameter with the arithmetic entropy coder using a different probability model corresponding to the prediction mode symbol type and a context values of prior prediction modes corresponding to locations of prior encoded pixel blocks. The encoded bitstream output from the lossless encoder 104 may be expected to be more compact (require less storage space or bandwidth) than the input to the lossless encoder 104.

In operation, the decoder 130 may substantially invert the operations of the encoder 120. Lossless decoder 106 may convert the encoded bitstream into a series of symbols representing coding parameters of portion of an image, and the block decoder 108 may convert block data and the symbols into reconstructed images.

In an aspect, the block coder 102 and the lossless coder 104 may operate at different scales within a single image, where different spatial scales may correspond to different layers of a coding protocol, and coded data and corresponding coding parameters may be produced by the block coder at different layers for the single image. The lossless coder 104 may then encoded the coded data and/or coding parameters of each corresponding scale produced by the block coder 102. For example, with a coding protocol similar to HEVC, the image portions may be pixel blocks of rectangular shape at a scale corresponding to an HEVC syntax layer such as coding tree unit (CTU), coding tree block (CTB), coding unit (CU), prediction unit (PU), or transform unity (TU).

In aspects, the block coder 102 may produce coding parameters as symbols of an alphabet having a corresponding of a symbol type of a particular syntax element. For example, a prediction mode syntax element may be represented as a prediction mode symbol type, where each prediction mode symbol indicates a selection from an alphabet of prediction modes. An example three-symbol alphabet for a prediction mode may include skip mode, intra mode, and inter mode, and a prediction-mode type symbol for a current block may indicate which of the three prediction modes the current block is predicted with.

Figure 2:
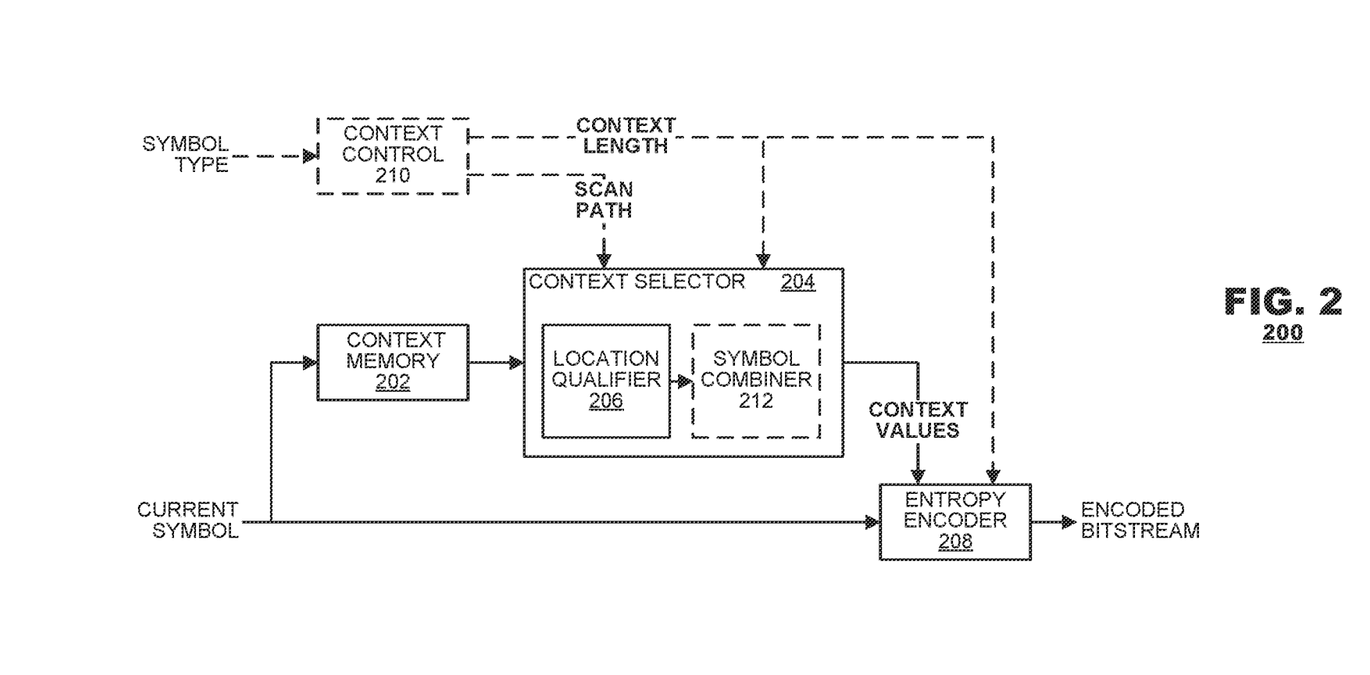
FIG. 2 is a block diagram of a lossless encoding system according to aspects of this disclosure.

FIG. 2 is a block diagram of a lossless encoding system 200 according to aspects of this disclosure System 200 includes a context memory 202, a context selector 204 including a location qualifier 206, and an entropy coder 208. In operation, context selector 204 may select context values based on prior symbols from the context memory 202 corresponding to the first image locations in an ordered scan path of image locations that are qualified by the location qualifier 206. An image location in the scan path may be qualified or disqualified, for example, based on whether or not a prior symbol corresponding to the location exists in the context memory 202 (such as if the location is outside the bounds of the currently encoded image), or based on prior coding parameters corresponding to the location. The entropy encoder 208 may then encode the current symbol user the selected context values as a context to produce a portion of the encoded bitstream indicating the current symbol.

In optional aspects, context control 210 may determine the ordered scan path and/or a context length from a symbol type of the current symbol. The symbol type may indicate, for example, the type of syntax element or coding parameter that the current symbol represents, and may also indicate the alphabet the current symbol is selected from. The determined scan path and/or context length may then be used by the context selector 204 for the current symbol. A context length may indicate the number of context values selected for the current symbol by context selector 204 as well as the number of context values used as context by entropy coder 208 for encoding the current symbol.

In other aspects, prior symbols from qualified prior locations may each be selected individually as context values. Alternately, optional symbol combiner 212 may combine multiple prior symbols from qualified locations into a single context value for use as context by the entropy coder 208. For example, two prior symbols may be averaged or summed into a single context value. A probability model for an entropy coder may grow exponentially with the number of context values it uses. A symbol combiner may reduce the complexity of an entropy coder by allowing a context to include more locations along the scan path than context values in an entropy coder's model.

In an aspect, the current symbol input lossless encoder 200 may be stored in context memory 202 for future reference as a prior encoded symbol.

Figure 3:
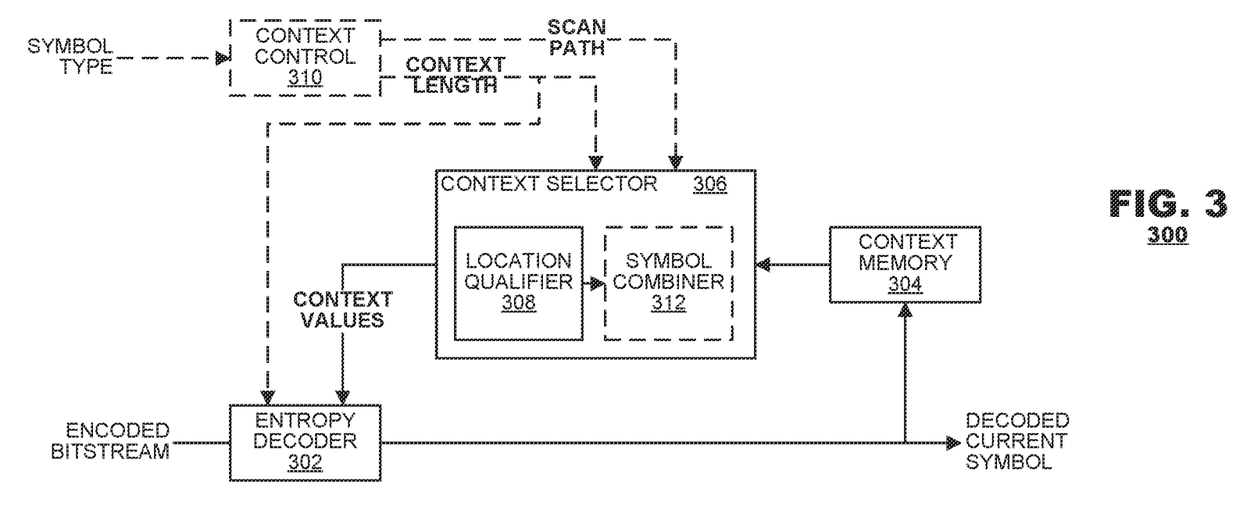
FIG. 3 is a block diagram of a lossless decoding system according to aspects of this disclosure.

FIG. 3 is a block diagram of a lossless decoding system 300 according to aspects of this disclosure Lossless decoding system 300 may substantially invert the operations of the lossless encoding system 200 to produce a decoded current symbol from an encoded bitstream. Lossless decoding system 300 may include an entropy decoder 302, a context memory 304, and a context selector 306 including a location qualifier 308. In operation, the context memory 304 may store prior decoded symbols, each corresponding to a location of image portion. The context selector 306 may select one or more context values based on prior decoded symbols from the context memory corresponding to the first qualified locations in an ordered scan path of image locations. The location qualifier 308 may qualify or disqualify the locations specified by the ordered scan path based on a qualification criteria. Example qualification criteria for an image location may include the existence of a prior symbol in the context memory corresponding to the image location, or example qualification criteria may be based on coding parameters used to code an image block at the corresponding image location.

As in the lossless encoder 200 (FIG. 2), the lossless decoder 300 may include optional aspects such as context control 310, which may determine the ordered scan path and/or a context length from a symbol type of the current symbol. The symbol type may indicate, for example, the type of syntax element or coding parameter that the current symbol represents, and may also indicate the alphabet the current symbol is selected from. The determined scan path and/or context length may then be used by the context selector 206 for the current symbol. A context length may indicate the number of context values selected for the current symbol by context selector 306 as well as the number of context values used as context by entropy coder 302 for decoding the current symbol.

In another aspect, prior symbols from qualified prior locations may each be selected individually as context values. Alternately, the optional symbol combiner 312 may combine multiple prior symbols from qualified locations into a single context value for use as context by the entropy coder. For example, two prior symbols may be averaged or summed into a single context value. A probability model for an entropy coder may grow exponentially with the number of context values it uses. A symbol combiner may reduce the complexity of an entropy coder by allowing a context to include more locations along the scan path than context values in an entropy coder's model.

In aspects, the context memory 304, the context selector 306, the location qualifier 308, and the optional symbol combiner 312 and the context control 310 may operate substantially identically to corresponding elements in lossless encoding system 200. Furthermore, context memories 202 and 304 may be managed according to cache rules for the coding protocol specifying when prior symbols are evicted from the context memory in order to limit the size of the context memory and to ensure coherence between an encoder's and decoder's context memory (e.g., coherence between context memory 202 and context memory 304).

Entropy coder 208 and entropy coder 302 may operate based on a synchronized probability model. Such a probability model may include a probability associated with each symbol in an alphabet for a particular symbol type. In some aspects, each symbol type may correspond to a particular syntax element of a governing coding protocol, and separate probability models may be maintained for different syntax elements that are encoded under a particular coding protocol For example, a new coding protocol derived from the AV1 standard video coding protocol may use the mapping in Table 1 of syntax element to cumulative distribution functions (CDFs) with a prior symbol context that are synchronized in both encoder and decoder. For example, the skip_mode syntax element shown in Table 1 indicates a coding parameter(s) related to a pixel block skip mode, may be coded with the specified CDF along with the flexible context selection techniques described herein. In particular, coding parameters for intra block copying (such as use_intrabc) may use the specified CDF along with the flexible context selection techniques described herein.

TABLE 1

Example mapping of syntax element to cumulative distribution functions (CDFs) with a prior symbol context

| Syntax Element | CDF Context |
| --- | --- |
| skip_mode | skip_mode_cdfs |
| skip_txfm | skip_txfm_cdfs |
| is_tip_ref_frame | tip_cdf |
| comp_group_idx | comp_group_idx_cdf |
| has_palette_y | palette_y_mode_cdf |
| is_inter | intra_inter_cdf |
| comp_mode | comp_inter_cdf |
| fsc_mode | fsc_mode_cdf |
| tx_depth | tx_size_cdf |
| use_intrabc | intrabc_cdf |
| ref_frame[0] | single_ref_cdf |
| ref_frame[0], ref_frame[1] | comp_ref0_cdf, comp_ref1_cdf |

Figure 4A:
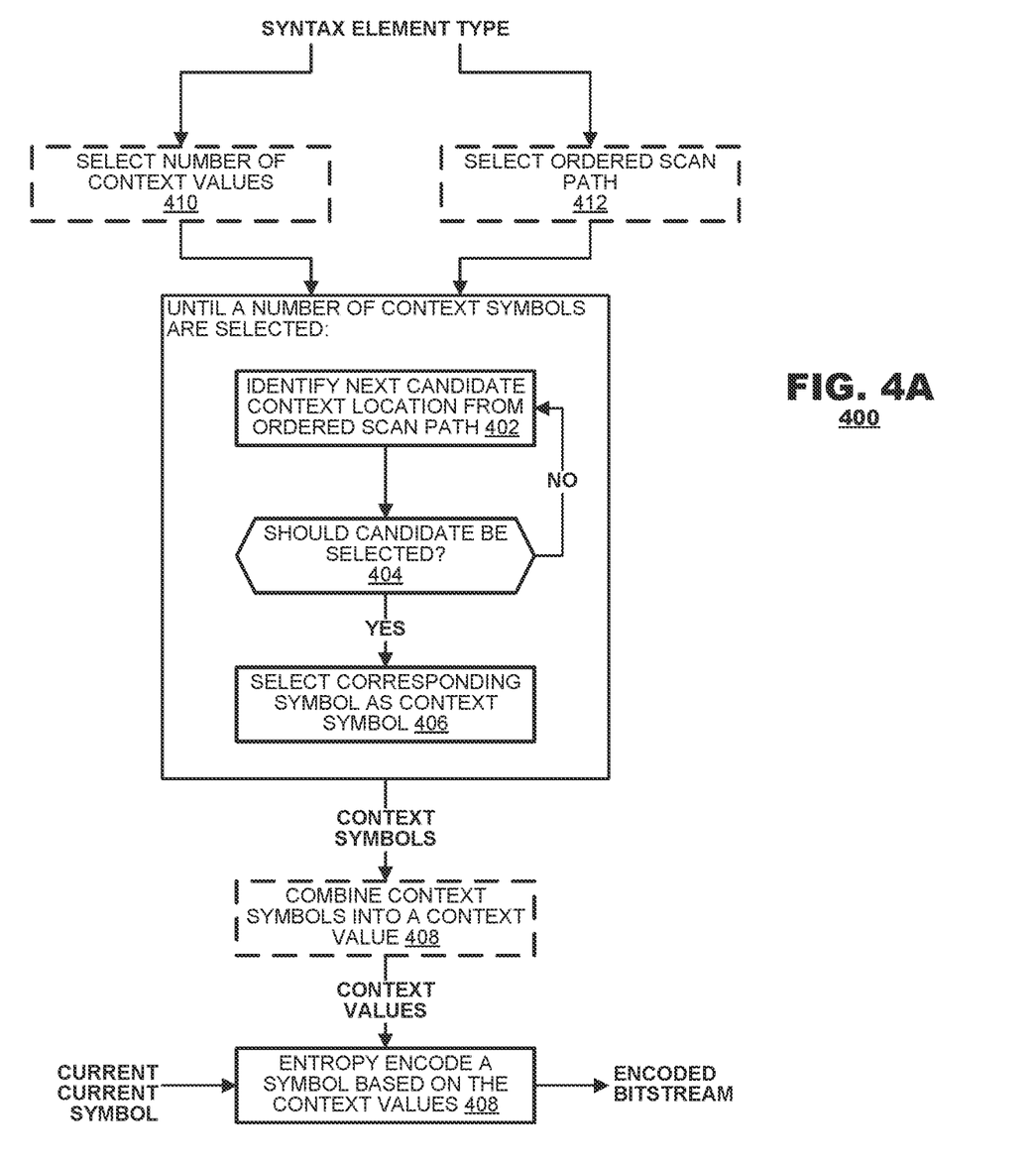
FIG. 4A illustrates a method for lossless encoding according to aspects of this disclosure.

FIG. 4A illustrates an encoding method 400 for lossless encoding according to aspects of this disclosure. The method 400 may include identifying a next candidate context location from an ordered scan path of image locations (box 402); determining if the candidate context location should be selected (box 404); and, if the candidate location is selected, selecting a prior symbol corresponding to the location as a context value (box 406). Boxes 402, 404, 406 may be repeated until a sufficient number of context symbols are selected. In optional box 408, two more context symbols may be combined into a single context value. Context symbols may be used directly as context values when they are not combined. Finally, method 400 may include entropy coding a current symbol based on the context values (box 408) to produce a portion of an encoded bitstream.

In optional aspects, a syntax element type may be used to select a number of context values (box 410) and to select an ordered scan path (box 412).

Figure 4B:
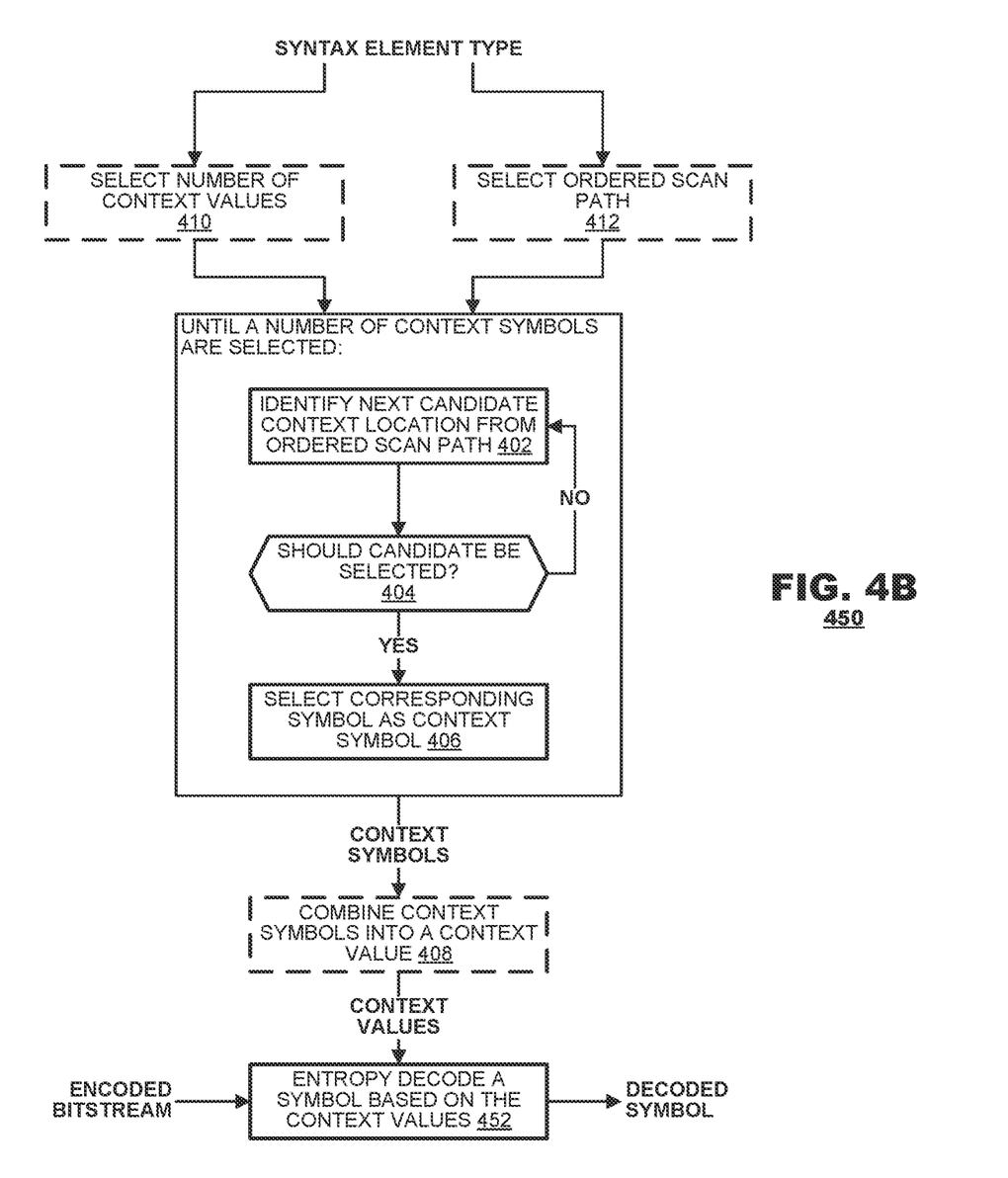
FIG. 4B illustrates a method for lossless decoding according to aspects of this disclosure.

FIG. 4B illustrates a decoding method 450 for lossless decoding according to aspects of this disclosure. In the decoding method 450, first context values are selected in boxes 402-408 boxes as they were in the corresponding boxes 402-408 of the encoding method 400 (FIG. 4A). Then in the decoding method 450, a current symbol is decoded based on the selected context values (box 452).

An ordered scan path may specify image locations to be considered for inclusion as context for entropy coding a current symbol from a current image location. In as aspect, the image locations in the ordered scan path may be specified as relative locations that are relative to the current image location. The current image location and scan path locations may specify locations of a portion of an image, such as a rectangularly shaped collection of pixels. In aspects, the shapes of image portions indicated by the current image location and the scan path locations may not all be the same shapes or sizes. For example, the current image block may be a 64×64 pixel block, a first scan path location may refer to a 4×8 pixel block, and a second scan path location may refer to a 16×16 pixel block. In another aspect, the image locations in a scan path may or may not be adjacent to a current location, and may or may not be a location in the same image. For example, an ordered scan path of image locations may include locations within the current image containing the current symbol's corresponding current image portion, and/or the ordered scan path may include locations in other frames, such as prior encoded (or prior decoded) frames. In this aspect, context "locations" as used herein may be spatial-frame locations that indicate both a spatial location within a frame as well as which frame (or which frame time in a video sequence) the location is in.

Figure 5:
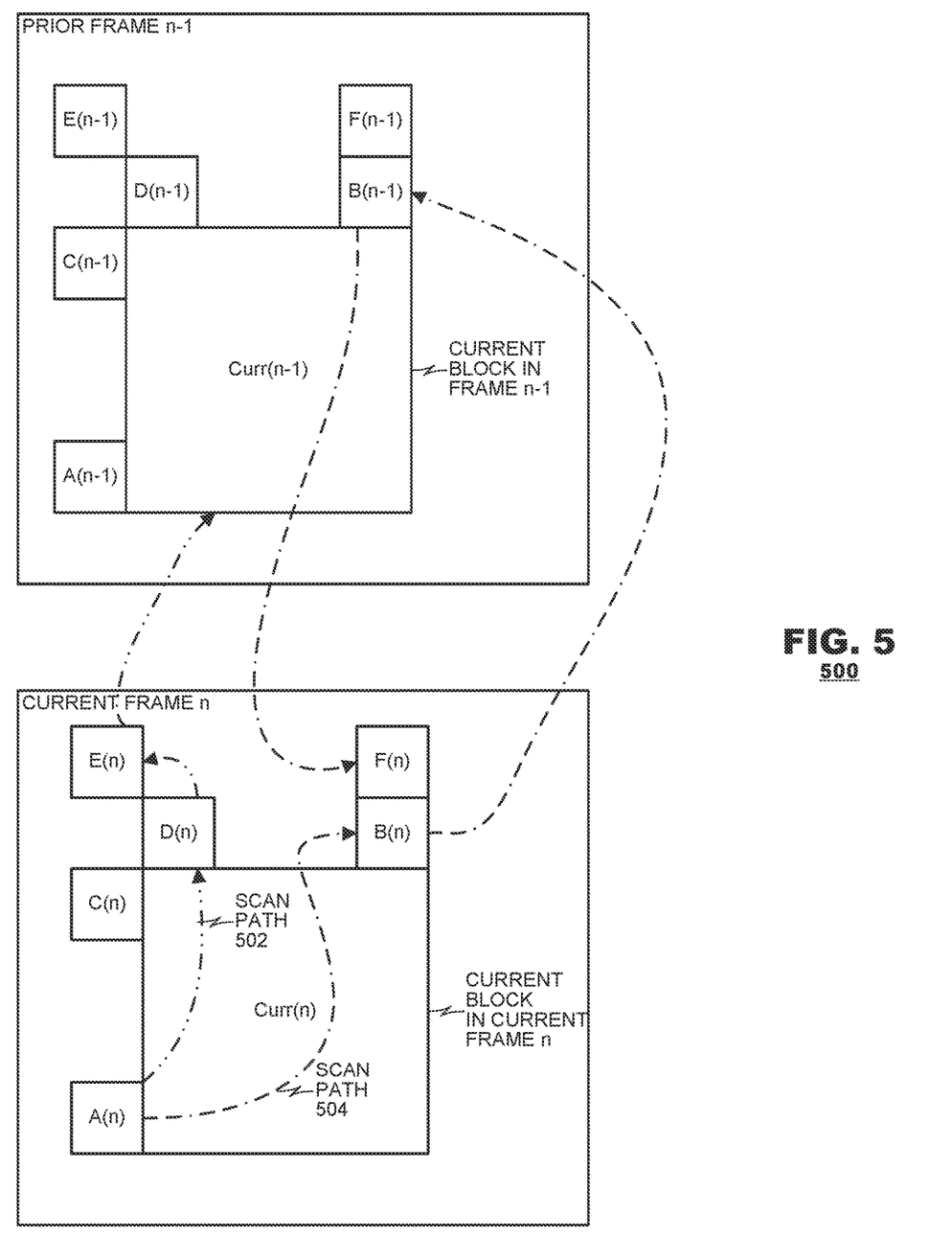
FIG. 5 illustrates example context locations in two image frames.

FIG. 5 illustrates example context locations 500 in two image frames. Context locations 500 may be used, for example, in an ordered scan path. FIG. 5 depicts two frames, a current frame n and a prior frame n-1. Current frame n includes a current block Curr(n) for which a coding context is to be developed. FIG. 5 also depicts several other blocks that might be used as context locations, including adjacent blocks A(n), B(n), C(n), and D(n). Current frame n also includes non-adjacent context locations, including blocks E(n) and F(n), which are not adjacent to current block Curr(n). In the example of FIG. 5, Curr(n) is not the same size as the context blocks A(n)-F(n), although in other applications, the one or more context block(s) may be the same size as a current block. FIG. 5 also depicts a prior frame n-1, may correspond to any previously encoded (or decoded) frame. FIG. 5 the location of a current block but in a frame n-1 is indicated as Curr(n-1) in FIG. 5, locations A-E in the frame n-1 are similarly indicated. FIG. 5 illustrates only example context locations. More generally, a scan order include candidate context locations that refer to a spatial time location of any previously coded (in an encoder) or decoded (in a decoder) portions of an image, and hence may refer to any prior encoded or decoded symbols stored in a context memory of prior encoded or decoded symbols.

FIG. 5 also illustrates two example ordered scan paths across various context locations in the current frame n and prior frame n-1. A first ordered scan path 502 (illustrated with a dot-dot-dash line pattern) includes space-frame locations in the following scan order: A(n), D(n), E(n), and Curr(n-1). A second ordered scan path 504 (illustrated with dash-dash-dot line pattern) includes space-frame locations in the following scan order: A(n), B(n), B(n-1), and F(n). An application of techniques described herein for selecting entropy coding context symbols may start by qualifying or disqualifying the initial location in the ordered scan path (which is A(n) in the example of both scan paths 502 and 504), and then continue qualifying or disqualifying locations in the scan path order until a sufficient number of qualifying locations are selected.

In a first example, scan path 502 to may be used to encode a symbol for a current block Curr(n) located on a left boarder of an image with a context based on a target context length of two prior symbols. In this example, all locations left of the current block Curr(n) will never have a prior symbol in any frame since those location do not correspond to a pixel block in any source images. Hence, none of the space-frame locations A(n), C(n), E(n), A(n-1), C(n-1), and E(n-1) do not have a corresponding prior symbol stored in a context memory of prior symbols. In this case, context selection (such as by context selector 204), will start by attempting to qualify the initial scan path candidate location A(n), and determine that location A(n) is disqualified and hence not selected for an encoding context. Context selection will then continue D(n), which is the next candidate location in the path, and D(n) may be qualified. Next up, E(n) is also disqualified since it is located left of the current image boundary, and then finally Curr(n-1) is qualified. In this example two locations, D(n) and Curr(N-1) have been qualified, and the desired context length is two, so scanning along the scan path 504 may stop at this point.

In a second example, scan path 504 may be used to encode a first frame in a sequence of frames with a context length goal of prior symbols from three context locations. In this case, since the current frame is the first frame, prior frames do not exist (and hence prior symbols corresponding to locations in prior frame n-1 do not exist in a context memory). In this case, starting again at the beginning of scan path 504, A(n) and B(n) may be qualified since a corresponding symbol may exist in the context memory. Then B(n-1) is disqualified because frame n-1 does not exist, and finally F(n) may be qualified as the third and final qualified location that meets the context length goal of three context locations.

The foregoing discussion has described operations of aspects of the present disclosure in the context of image encoders and decoder, including encoder 120 and decoder 130. Commonly, these components are provided as electronic devices. Imaging systems and network channels can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically include instructions stored in non-transitory physical storage media such as electronic-based, magnetic-based storage devices, and/or optically-based storage devices, where they are read into a processor and executed. Decoders are commonly packaged in consumer electronic devices, such as smartphones, tablet computers, gaming systems, DVD players, portable media players, and the like. They can also be packaged in consumer software applications such as video games, media players, media editors, and the like. And, of course, these components may be provided as hybrid systems with distributed functionality across dedicated hardware components and programmed general-purpose processors, as desired.

Imaging systems of devices, including encoders and decoders, may exchange video through channels in a variety of ways. They may communicate with each other via communication and/or computer networks as illustrated in FIG. 1. In still other applications, video systems may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method of entropy coding, comprising:
   scanning a set of candidate context values according to an ordered scan path of candidate context locations,
   at each scan location, until a predetermined number of selections are made:
      determining whether a respective candidate context value is to be selected to determine an entropy coding context for a current pixel block to be entropy coded,
      selecting the respective candidate context value when it is determined that the candidate context value is to be selected; and
   entropy encoding a current symbol for a current pixel block location based on the selected context values.

2. The method of claim 1, wherein the set of candidate context values is larger than the predetermined number of selections.

3. The method of claim 1, wherein a length of the ordered scan path is larger than the predetermined number of selections.

4. The method of claim 1, wherein the predetermined number of selections is identified in signaling between an encoder and a decoder.

5. The method of claim 1, wherein the predetermined number of selections and the ordered scan path is identified based on a type of the current symbol.

6. The method of claim 1, further comprising combining two or more selected context values into a combined context value, and wherein the entropy coding is based on the combined context value.

7. The method of claim 1, wherein the ordered scan path traverses locations of at least two previously-coded pixel blocks in a common frame to the current pixel block.

8. The method of claim 1, wherein the ordered scan path traverses a location of a previously-coded pixel block of a frame coded prior to coding of a frame of the current pixel block.

9. The method of claim 1, wherein the ordered scan path traverses locations of at least two previously-coded pixel blocks, a first previously-coded pixel block in a common frame to the current pixel block and second previously-coded pixel block in a frame coded prior to coding of a frame of the current pixel block.

10. A non-transitory computer-readable medium comprising instructions executable by at least one processor to perform a method comprising:
    scanning a set of candidate context values according to an ordered scan path of the context values,
    at each scan location, until a predetermined number of selections are made:
       determining whether a respective candidate context value is to be selected to determine an entropy coding context for a current pixel block to be entropy coded,
       selecting the respective candidate context value when it is determined that the candidate context value is to be selected; and
    entropy encoding a current symbol for a current pixel block location based on the selected context values.

11. The computer-readable medium of claim 10, wherein the set of candidate context values is larger than the predetermined number of selections.

12. The computer-readable medium of claim 10, wherein a length of the ordered scan path is larger than the predetermined number of selections.

13. The computer-readable medium of claim 10, wherein the predetermined number of selections is identified in signaling between an encoder and a decoder.

14. The computer-readable medium of claim 10, wherein the predetermined number of selections and the ordered scan path is identified based on a type of the current symbol.

15. The computer-readable medium of claim 10, wherein the method further comprises combining two or more selected context values into a combined context value, and wherein the entropy coding is based on the combined context value.

16. The computer-readable medium of claim 10, wherein the ordered scan path traverses locations of at least two previously-coded pixel blocks in a common frame to the current pixel block.

17. The computer-readable medium of claim 10, wherein the ordered scan path traverses a location of a previously-coded pixel block of a frame coded prior to coding of a frame of the current pixel block.

18. The computer-readable medium of claim 10, wherein the ordered scan path traverses locations of at least two previously-coded pixel blocks, a first previously-coded pixel block in a common frame to the current pixel block and second previously-coded pixel block in a frame coded prior to coding of a frame of the current pixel block.

19. A system for entropy coding, comprising:
a context selector to
scan a set of candidate context values according to an ordered scan path of candidate context locations,
at each scan location, until a predetermined number of selections are made:
determine whether a respective candidate context value is to be selected to determine an entropy coding context for a current pixel block to be entropy coded, and
select the respective candidate context value when it is determined that the candidate context value is to be selected; and
a context memory to store the selected context values;
an entropy encoder having an input for a current symbol for a current pixel block location based on the selected context values.

20. The system of claim 19, wherein the set of candidate context values is larger than the predetermined number of selections.

21. The system of claim 19, wherein a length of the ordered scan path is larger than the predetermined number of selections.

22. The system of claim 19, wherein the context selector identifies the predetermined number of selections in signaling between an encoder and a decoder.

23. The system of claim 19, wherein the predetermined number of selections and the ordered scan path are identified based on a type of the current symbol.

24. The system of claim 19, wherein the context selector combines two or more selected context values into a combined context value, and wherein the entropy coder performs its entropy coding based on the combined context value.

25. The system of claim 19, wherein the ordered scan path traverses locations of at least two previously-coded pixel blocks in a common frame to the current pixel block.

26. The system of claim 19, wherein the ordered scan path traverses a location of a previously-coded pixel block of a frame coded prior to coding of a frame of the current pixel block.

27. The system of claim 19, wherein the ordered scan path traverses locations of at least two previously-coded pixel blocks, a first previously-coded pixel block in a common frame to the current pixel block and second previously-coded pixel block in a frame coded prior to coding of a frame of the current pixel block.

* * * * *